United States Patent Office

PETER H. MURRAY, OF PORTSMOUTH, OHIO.

Letters Patent No. 113,327, dated April 4, 1871.

IMPROVEMENT IN THE MODES OF PREPARING PAPER FOR PHOTOGRAPHIC PURPOSES.

The Schedule referred to in these Letters Patent and making part of the same.

I, PETER H. MURRAY, of the city of Portsmouth, county of Scioto and State of Ohio, have invented a Process of Preparing Photographic Paper, of which the following is a specification.

Photographic paper now in use is coated with a solution of nitrate of silver of a strength from twenty to forty grains of silver, according to the paper used, to the ounce of distilled water.

My process or improvement in making said paper is as follows:

After the solution has thoroughly dried on the paper, as above stated, then subject the paper thus prepared to chlorine gas, which is made in this proportion: Introduce two hundred and fifty grains black oxide of manganese and four fluid ounces of hydrochloric acid into a retort and apply a gentle heat; collect the gas in jars filled with water over a pneumatic trough, until the nitrate has changed to a chloride of silver, which takes from ten to twenty minutes, according to the kind of paper used, leaving it distributed on the photographic paper in an even surface, which cannot be obtained by any liquid combined form of chlorine, as the chloride of silver is precipitated in an uneven surface by all liquid-combined forms of chlorine, which renders the paper unfit for photographic use.

The paper is then subjected to hydrogen, which is prepared by introducing three hundred grains of granulated zinc and four fluid ounces of dilute sulphur acid, consisting of one part, by measure, of oil of vitriol and five parts of water, into a retort, and applying gentle heat; collect the gas over water in suitable jars, which is taken up readily by the chlorine, producing hydrochloric-acid gas, and liberating the nitrate of silver as original.

Then neutralize the hydrochloric acid with an alkali gas by subjecting the paper to the fumes of ammonia, (as in ordinary use,) which renders the paper again sensitive to light, and is then ready for use.

Claims.

I claim—

1. The application of chlorine gas for the purpose of rendering photographic paper more stable after it has been sensitized by nitrate of silver, preparatory to its being converted into a photograph by the solar rays.

2. The application of hydrogen gas for the purpose of re-rendering the paper, afore-rendered insensitive by the action of chlorine, sensitive to the action of the solar rays.

PETER H. MURRAY.

Witnesses:
MARTIN CRAIN,
JNO. G. COFFIN.